Patented July 10, 1923.

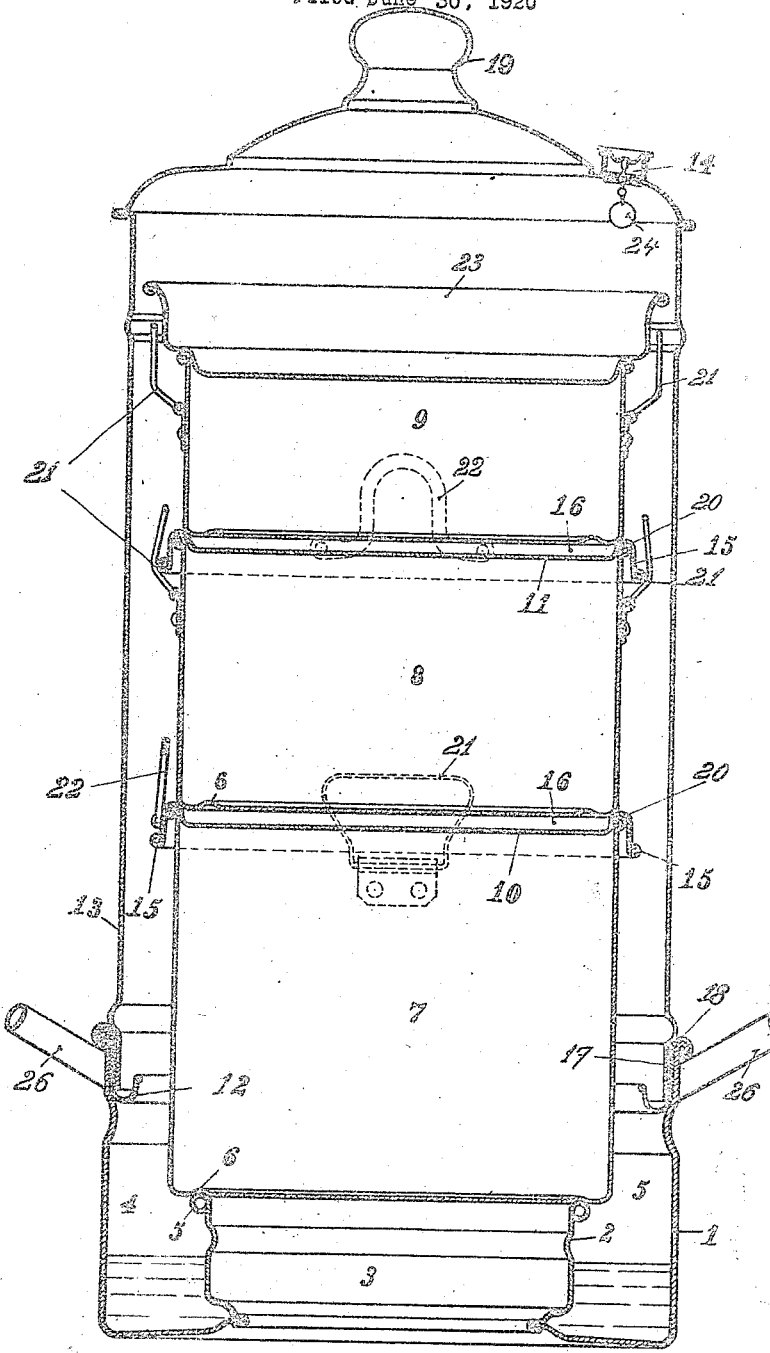

1,461,092

UNITED STATES PATENT OFFICE.

MILAN IVANCIC, DECEASED, LATE OF KILCHBERG, SWITZERLAND; BY ALMA IVANCIC, ADMINISTRATRIX, OF ZURICH, SWITZERLAND.

COOKING DEVICE.

Application filed June 30, 1920. Serial No. 393,150.

(GRANTED UNDER THE PROVISIONS OF THE ACT OF MARCH 3, 1921, 41 STAT. L., 1313.)

*To all whom it may concern:*

Be it known that MILAN IVANCIC, deceased, late a subject of the King of Italy, and resident of No. 3 Haldenweg, Kilchberg, Canton Zurich, Switzerland, had invented new and useful Improvements in Cooking Devices (for which I filed an application in Switzerland August 25, 1916, of which the following is a specification.

The present invention relates to an improved steam cooking device.

The main object of the invention is to provide a culinary device containing several smaller receptacles within a hood, in which different kinds of food are cooked or baked simultaneously. Another object consists in the provision of a device of said class in which the flavor or smell of the food cooked in one receptacle is not transferred to food in any other receptacle, each food losing nothing of its particular taste. A still other object consists in the provision of a gas cooking device which needs little gas. With the above objects in view the invention resides in the parts and combination of parts hereinafter described and particularly set forth in the claims appended hereto.

In the accompanying drawing one form of construction is shown in a sectional elevation by way of an example.

The device shown in the drawing comprises an annular vessel 1 adapted to be placed over a gas stove. The vessel 1 is provided with handles 26 and with a central portion 2 which is open at the top and which forms a rest for a set of superposed pans 7, 8, 9. On the upper rim 18 of the vessel 1 a groove 12 is provided projecting inwardly. In said groove 12 projects the lower end 17 of a hood 13 which rests on the rim 18 of vessel 1. The hood 13 is closed at the upper end and is provided with a knob 19. In use the vessel 1 is partly filled with water which when heated gives off steam. The vessel 7 is partly heated by the gases of combustion passing from the gas stove into the central portion 3 and partly by the steam arising from the water in the vessel 1. Each of the pans 7, 8 is covered by a lid 10 having a downwardly projecting outer rim 15 outside the side wall of the pan. The center portion of each lid 10 projects into the pan and the annular ridge 20 serves as a seat for the superposed pan. In the bottom of each pan there is a circular groove 6 corresponding in diameter to the upper rim 5 of the central portion 2. The groove 6 together with the top portion 5 gives a joint which prevents the escape of steam from the vessel 1. As each pan is provided with the groove 6 each of them may be placed on the portion 5 and the contents of each pan may be exposed to the direct action of the flame of the gas stove below the central portion 2. Each pan is provided with two handles 21 and to each lid 10 an eyelet 22 is fixed. The uppermost pan is covered by a tray 23 which may be filled with water. The steam arising from the water in vessel 1 condenses partly on the walls of the hood and of the vessels 7, 8, 9, the water of condensation is collected in the groove 12 and acts there as a water seal. Some steam may escape through the opening 14 in the top of the hood which opening may be closed by a ball 24 held on a chain. The water of condensation cannot pass into any one of the vessels 7, 8, the water drops from the rims 15 into the vessel 1. The steam and vapors generated within the vessels 7, 8, 9 cannot escape the lids closing the vessels tightly. The space 16 left between the lid 10 of one vessel and of the bottom of the superposed vessels act as a heat cushion.

While I have described the preferred construction of the invention I wish it to be clearly understood that various changes in form and construction may be made without departing from the spirit of the invention.

What I claim and wish to secure by Letters Patent is:

1. A cooking device comprising in combination an annular vessel, a hood placed on said vessel, a plurality of smaller vessels arranged superposed on the central portion of said annular vessel.

2. A cooking device comprising in combination an annular vessel, a hood placed on said vessel, a plurality of smaller vessels arranged superposed on the central portion of said annular vessel each of said vessels being provided with a lid having a downwardly projecting rim.

3. A cooking device comprising in combination an annular vessel, a hood placed on said vessel, a plurality of smaller vessels arranged superposed on the central portion of said annular vessel said annular vessel being provided with a groove adapted to receive the lower end of the hood.

4. A cooking device comprising in combination an annular vessel, a hood placed on said vessel, a plurality of smaller vessels arranged superposed on the central portion of said annular vessel said annular vessel being provided with a central portion open at the top giving the heating agent access to the lowermost pan.

In witness whereof I affix my signature.

ALMA IVANCIC,
*Administratrix of Milan Ivancic, deceased.*